Nov. 21, 1944.   H. N. OTT   2,363,080
MICROSCOPE
Filed June 23, 1943.   3 Sheets-Sheet 1

INVENTOR
Harvey N. Ott
BY
Parker Prochnow & Farmer
ATTORNEYS

Nov. 21, 1944.    H. N. OTT    2,363,080
MICROSCOPE
Filed June 23, 1943    3 Sheets-Sheet 2
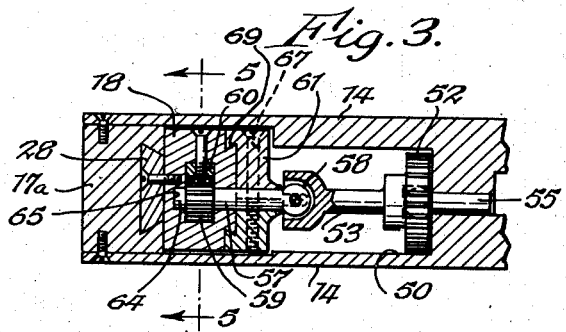
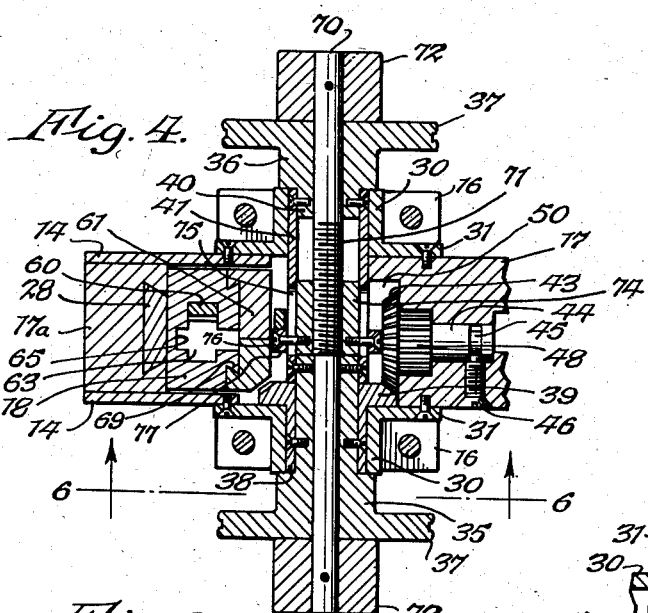
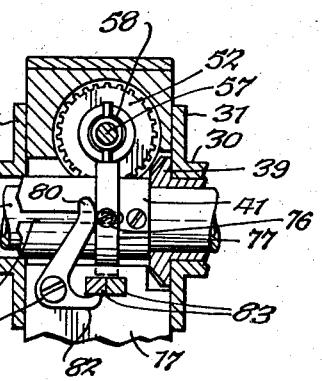
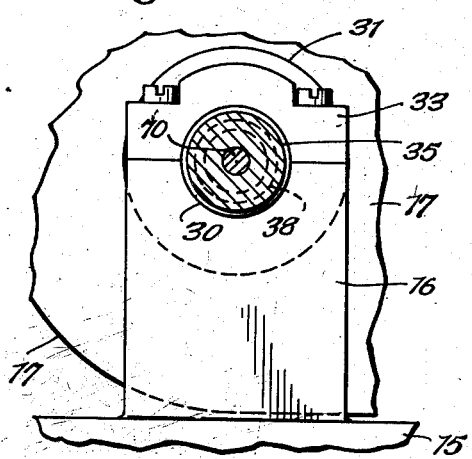
INVENTOR
Harvey N. Ott
BY
Parker Prochnow & Turner
ATTORNEYS Nov. 21, 1944.  H. N. OTT  2,363,080
MICROSCOPE
Filed June 23, 1943  3 Sheets-Sheet 3

INVENTOR
Harvey N. Ott
BY
Parker Prochnow & Farmer
ATTORNEYS

Patented Nov. 21, 1944

2,363,080

UNITED STATES PATENT OFFICE 2,363,080

MICROSCOPE

Harvey N. Ott, Buffalo, N. Y.

Application June 23, 1943, Serial No. 491,931

16 Claims. (Cl. 88—39)

This invention relates to improvements in microscopes and particularly to means for adjusting the body tube of a microscope relatively to the object or specimen.

One of the objects of this invention is to provide a microscope of this type with means of improved construction for effecting the fine and coarse adjustments of the body tube relatively to the specimen.

Another object is to provide a microscope with fine and coarse adjustments of improved construction which requires only a single bearing or slidable connection of the arm of the microscope relatively to the main frame thereof. A further object is to provide an elongated bearing of this type, which bearing provides increased accuracy and strength and serves for making both the fine and coarse adjustments.

A further object of this invention is to provide a bearing block having a pinion shaft journalled therein for effecting the coarse adjustment of the arm relatively to the bearing block and which pinion shaft is frictionally gripped by the bearing block to prevent relative movement of the bearing block with regard to the arm except by turning of said pinion shaft. A further object of this invention is to provide a bearing block of this type which is entirely detached from the main frame and which is supported by means of the fine adjustment mechanism and which is movable with the arm relatively to the main frame by means of the fine adjustment mechanism.

A further object of this invention is to provide a microscope having the fine and coarse adjustment buttons or disks mounted to rotate about a concentric axis fixed with relation to the frame of the microscope. A further object of this invention is to provide fine and coarse adjusting shafts which are mounted on the inclination joint of the microscope. Another object is to provide fine and coarse adjustment shafts concentric with each other and with the inclination joint.

A further object is to provide an adjusting mechanism for a microscope in which a movable connection is provided in the portion of the coarse adjustment leading to the bearing block, to permit adjustment of this block by the fine adjustment mechanism.

Other objects and advantages of this invention will appear from the following description and claims.

In the accompanying drawings, which show by way of example, some embodiments of this invention:

Figures 1, 2:
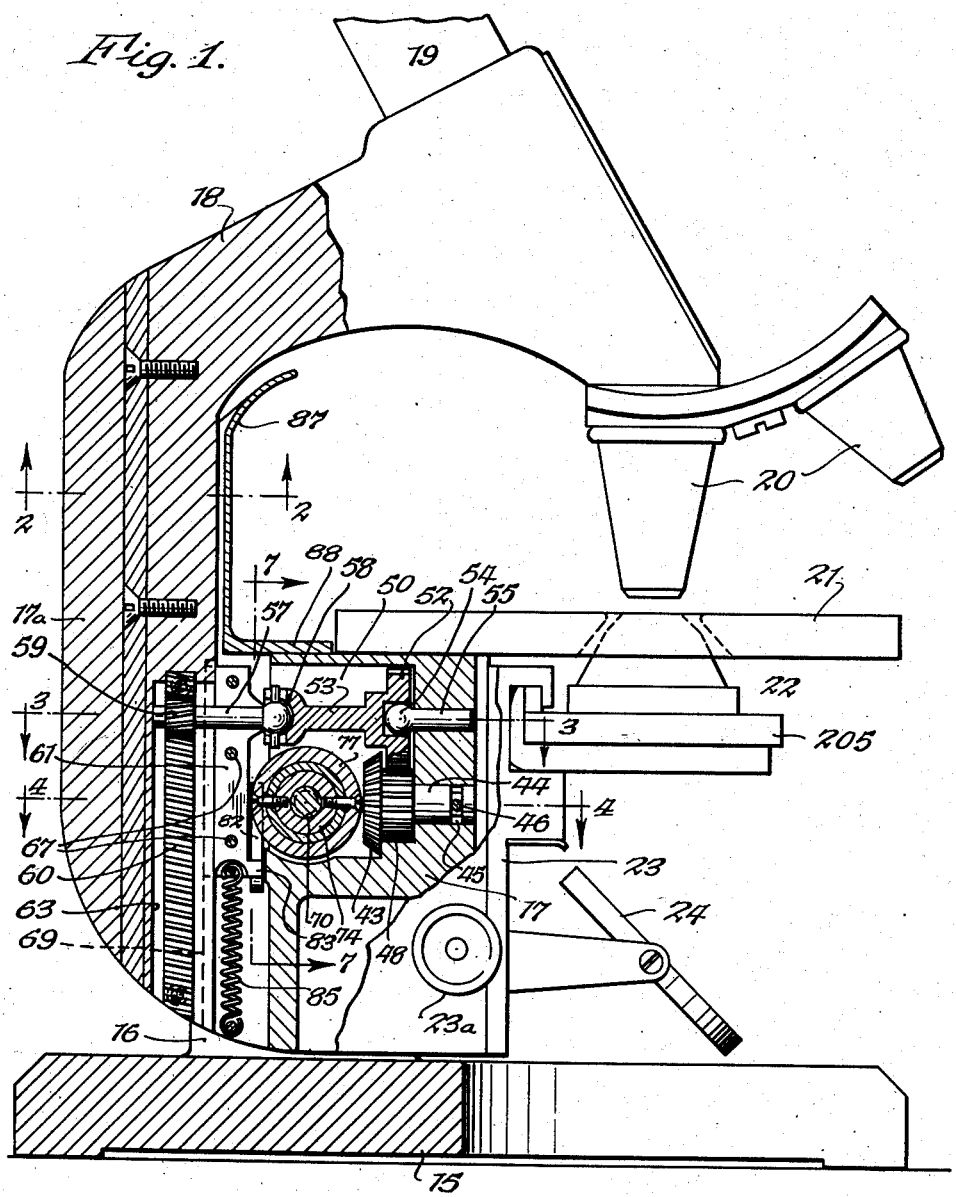
Fig. 1 is a fragmentary side elevation, partly in section, of a microscope embodying this invention.
Fig. 2 is a transverse sectional plan view thereof, on line 2—2, Fig. 1.

Figs. 3 and 4 are sectional plan views thereof, respectively on lines 3—3 and 4—4, Fig. 1.

Fig. 5 is a sectional elevation thereof, on line 5—5, Fig. 3.

Fig. 6 is a fragmentary elevation thereof, partly in section, on line 6—6, Fig. 4.

Fig. 7 is a fragmentary sectional elevation thereof, on line 7—7, Fig. 1.

Figure 8:
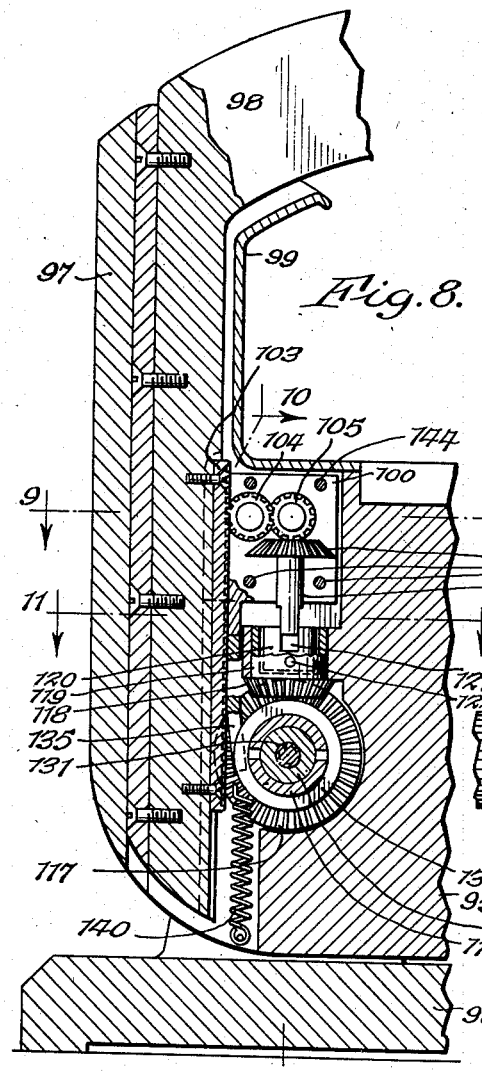
Figure 10:
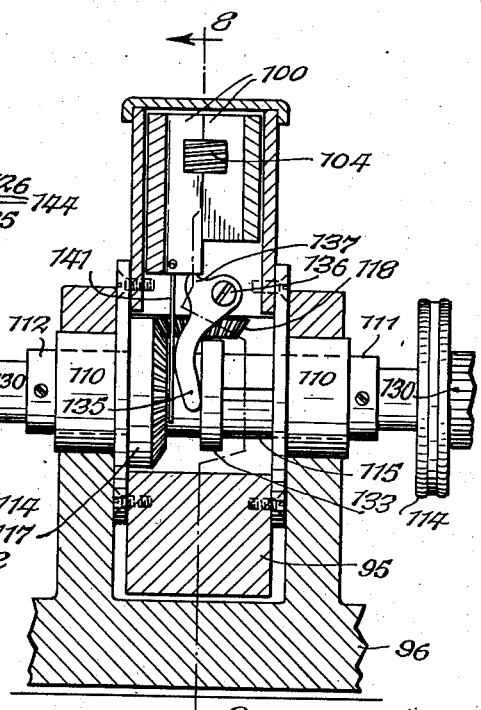

Fig. 8 is a fragmentary sectional elevation of a microscope provided with fine and coarse adjustments of modified construction, the section being taken on line 8—8, Fig. 10.

Figure 9:
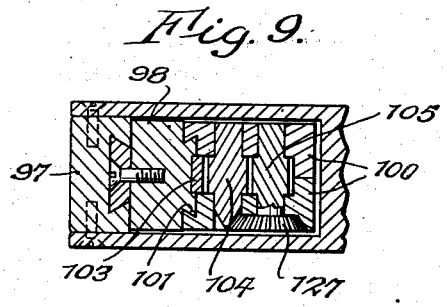

Fig. 9 is a transverse section thereof, on line 9—9, Fig. 8.

Fig. 10 is a fragmentary sectional elevation thereof, approximately on line 10—10, Fig. 8.

Figure 11:
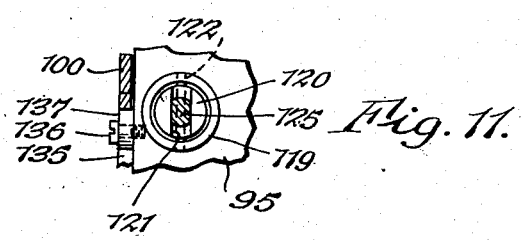

Fig. 11 is a fragmentary sectional plan view thereof, on line 11—11, Fig. 8.

The microscope shown by way of example in Figs. 1 to 7 includes a base 15 which may be of any usual or suitable form, and which has a pair of upwardly extending spaced pillars 16 between which the main frame 17 of the microscope is mounted by means of an inclination joint, thus permitting the microscope to be tilted to various angles as may be desired. The main frame has a considerable portion thereof adjacent to and above the inclination joint recessed or hollow to house the coarse and fine adjustment mechanisms, and consequently, this portion of the main frame has side walls 14, to the front end of which the lower portion of an upright guide portion 17a of the main frame may be rigidly secured in any suitable manner, see particularly Figs. 3 and 4.

The arm 18 may carry any suitable type of body tube, and since the body tube and other optical parts of the microscope are not a part of this invention, they are not shown in detail. 19 represents the body tube which may be provided with one or more objectives 20. 21 represents the stage of the microscope, which is securely mounted on the main frame 17, and 22 represents a condenser for projecting light to the object. The condenser is mounted on a carriage or sub-stage 23 which may be adjustable relatively to the main frame of the microscope by means of an adjustment wheel or button 23a in any suitable or desired manner, no adjustment mechanism being shown in the drawings. A mirror 24 may also be mounted on the carriage 23.

The arm 18 may be adjustably mounted on the main frame 17 in any suitable or desired manner. In the construction shown, the main frame member 17a is provided with the usual dovetailed groove in which a correspondingly shaped guide track member 28 is arranged to slide, this member being secured to the arm 18 of the microscope in any suitable manner, for example, by means of screws as shown. The lower portion of the arm 18 may extend between the side walls 14 of the main frame. By means of this construction, a bearing of more than usual length is provided which ensures accuracy of movement of the arm relatively to the frame of the microscope and also results in a rigid and durable construction. As will be hereinafter explained, both the fine and coarse adjustments employ this bearing to adjust the arm 18.

The inclination joint may be formed in any suitable manner, and in the construction shown, trunnions are journalled in bearings provided in the pedestals 16, as clearly shown in Figs. 4 and 6. These trunnions 30 have flanges 31 which are suitably secured to the main frame member 17 and the side walls 14 thereof, for example, by screws as shown, and the trunnions extend into bearings formed partly in the pillars 16 and partly in the bearing caps 33 of these pillars and the necessary friction for holding the body tube and the main frame in the desired inclination may be attained by tightening the screws which clamp the bearing caps 33 to the pillars. By means of this construction, the hollow trunnions 30 have a sufficiently large internal diameter so that the coarse and fine adjustment shafts may extend into the trunnions.

In the particular construction illustrated, the coarse adjustment is effected by means of a pair of hollow shafts 35 and 36, both of these shafts being provided at their outer ends with coarse adjustment actuating means, such as disks or buttons 37. The hollow coarse adjustment shaft 35 is of materially smaller diameter than the internal diameter of the trunnion 30 and a sleeve 38 of a bevel gear 39 extends about the coarse adjustment shaft 35 and is secured thereto, and this sleeve bears in the hollow trunnion. The other coarse adjustment shaft 36 has a portion 40 of reduced diameter to which a connecting sleeve 41 is secured. The other end of this sleeve is secured to a portion of the hollow coarse adjustment shaft 35 which extends beyond the bevel gear sleeve 38, so that the two coarse adjustment shafts are rigidly connected, thus permitting the coarse adjustment to be actuated by either disk or button 37. Any other means for connecting the two coarse adjustment shafts and for mounting a bevel gear thereon may be provided, if desired.

The bevel pinion 39 meshes with a bevel pinion 43 having a shaft 44 journalled on the main frame 17. This gear and its shaft may be held against endwise movement by means of an annular groove 45 into which an end of a screw or pin 46 enters. The shaft 44 has a spur gear 48 secured thereto, the bevel gear 43 and the spur gear 48 being arranged in a recess 50 formed for that purpose in the main frame 17. The spur gear 48, as clearly shown in Fig. 1, meshes with another spur gear 52 which may be secured to or formed integral with a shaft 53. The end of this shaft remote from the gear 52 is arranged for limited vertical movement, which may be provided for by mounting the end of the shaft on which the gear 52 is arranged on the ball portion 54 of a bearing pin 55 suitably secured in the main frame 17, the ball portion 54 extending into a hole or recess concentrically arranged with reference to the gear 52. Any other construction for permitting this shaft 53 to swing to a limited extent may be provided, if desired.

The part of the shaft 53 remote from the gear 52 is connected to a coarse adjustment pinion shaft 57 by mean of a universal joint 58 of any suitable or usual construction. The pinion shaft 57 has a pinion 59 mounted thereon which meshes with a rack 60 suitably secured on the arm 18 of the microscope, and this pinion shaft 57 is suitably journalled in a floating bearing block or element 61 interposed between the adjusting means and the arm 18, and which will be hereinafter more fully described. The rack 60 is mounted in a side of an elongated recess 63 formed in the arm 18, see also Fig. 5. The recess is made large enough to receive the pinion 59 and in order to hold the pinion in correct mesh with the rack 60, the pinion shaft 57 is preferably provided with an extension 64 which fits in an elongated groove 65 formed in the front wall of the groove 63. Consequently, it will be obvious that when the coarse adjustment button is turned, rotation will be transmitted through the bevel gears 39 and 43 and the spur gears 48 and 52 to the pinion 59, and the pinion meshing with the rack 60 will produce up and down movement of the arm 18 of the microscope. Since the floating bearing block or interponent element 61 is movable relatively to the main frame of the microscope, it will be obvious that by means of the construction described, a floating drive connection is provided in the coarse adjustment mechanism, by means of which rotation is transmitted to the shaft 57 regardless of the position of the floating bearing block.

The floating bearing block 61 in which the coarse adjustment pinion shaft 57 bears, is slidably mounted on the arm 18 and has no sliding connection with or bearing on the main frame of the microscope. Also this block is frictionally connected with the microscope arm so that the arm is moved relatively to the block only by turning the coarse adjustment mechanism. This frictional connection may be made in any suitable manner and in the construction illustrated, the floating bearing block is preferably made of two pieces which are secured together by means of screws 67. The bearing for the shaft 57 is formed partly in each of the two parts of the floating bearing block, and the two parts of the block are so constructed and clamped together by the screws that they grip the pinion shaft 57 with the desired tension so that the weight of the arm 18 and the parts mounted thereon cannot cause the rack to impart turning movement to the pinion 59. The friction on the shaft 57, however, permits the same to be turned by means of the coarse adjusting mechanism.

The floating bearing block is slidably mounted on the arm 18 of the microscope in any suitable or desired manner, and in the construction illustrated, the arm has a dove-tailed guide track 69, Figs. 3 and 4. The two parts of the floating bearing block engage this dove-tailed track so that the arm 18 may move relatively to the floating bearing block during the actuation of the coarse adjustment mechanism. If desired, the two parts of the bearing block may frictionally grip the track 69 in place of gripping the pinion shaft 59.

The floating bearing block, which is detached from and has no support on the main frame 17, is supported in its operative position solely by the fine adjustment mechanism and is also movable by means of this mechanism for effecting fine adjustment of the arm. Since the floating bearing block is frictionally held on the arm 18, it will be obvious that by raising or lowering this block, the arm 18 and the parts mounted thereon will also be raised and lowered.

The fine adjustment mechanism includes a fine adjustment shaft 70 having a screw-threaded portion 71 and is provided at opposite ends with fine adjustment actuating means, such as buttons or knobs 72. This shaft bears in the hollow coarse adjustment shafts and is rotatable relatively to these shafts. The screw-threaded portion 71 of the shaft engages a nut 74 arranged within the connecting sleeve 41 which connects the two hollow coarse adjustment shafts. This nut is held against rotation relatively to the connecting sleeve 41, for example, by providing this sleeve with longitudinal slots 75. Screws 76 extend through the slots 75 and also connect a fine adjustment ring 77 to the fine adjustment nut 74, see also Fig. 7. As a result of this construction, it will be noted that when the coarse adjustment buttons or disks 37 are turned, the fine adjustment shaft 70 will turn with the coarse adjustment shafts and with the connecting sleeve 41. Consequently, the nut 74 and the fine adjustment ring 77 will turn with the fine adjustment screw, so that the turning of the screw by means of the coarse adjustment shafts will produce no movement of the nut 74 or ring 77 lengthwise of these shafts and of the sleeve 41. When, however, the fine adjustment shaft is turned while the coarse adjustment shafts remain stationary, the threaded portion 71 of the fine adjustment shaft causes the fine adjustment nut 74 to move lengthwise of the sleeve 41 and this lengthwise motion is transmitted through the screws 76 to the fine adjustment ring 77, so that this ring will then move lengthwise of the sleeve 41.

The lengthwise movement of the fine adjustment sleeve 77 is transmitted to the longer arm 80 of the bell crank lever pivoted at 81 on the main frame of the microscope. The short arm 82 of the bell crank lever engages the underface of a projecting portion 83 of the floating bearing block 61, see also Fig. 1. Consequently, by swinging the lever 80, the floating bearing block 61 is moved either up or down, and this movement is transmitted to the arm 18 of the microscope because of the frictional grip of the pinion shaft 57 by the two parts of the floating bearing block 61. The inner ends of the coarse adjustment shafts 35 and 36 serve to limit the movement of the fine adjustment nut 74, and consequently, also the movement of the floating bearing block 61.

In order to supplement the weight of the arm 18 and the floating bearing block to ensure a contact between the projecting or toe portion 83 of the bearing block and the fine adjustment lever 82, a spring 85 is preferably employed, the lower end of which is hooked on a part of the main frame 17 and the upper end of which is connected with the floating bearing block 61.

By means of the construction shown, it will be noted that the coarse and fine adjustment shafts are rotatable about an axis concentric with the axis of the inclination joint of the microscope, and consequently, the positions of these fine and coarse adjustment buttons do not change, regardless of the adjustment of the inclination joint or of the arm of the microscope. These adjustment buttons are located well below the level of the stage 21 in such position that they are readily accessible to the hands of the user of the microscope while his hands rest upon the table or support on which the microscope stands. By means of the universal joint in the coarse adjustment gear train, the slight up and down movement of the floating bearing block 61 is made possible.

87 represents a grip or guard for the microscope, the lower part of which has a flange 88 which is secured to the upper face of the main frame 17. The guard also has side flanges 89 which extend along the sides of the arm 18 and are secured to the upright guide portion 17a of the main frame. The microscope may be readily lifted or moved about by grasping this guard, which also forms a protection for the lower portion of the arm 18 of the microscope.

It will be noted from the foregoing description that the microscope is provided with a long sliding bearing between the arm 18 and the main frame through the medium of the upright guide portion 17a. This long bearing provides strength and accuracy of adjustment and it will also be noted that this bearing serves both for the movement of the coarse adjustment mechanism and the fine adjustment mechanism so that only one bearing between the main frame and the arm is required.

In the microscope shown in Figs. 8 to 11, a somewhat similar microscope is shown having a different coarse adjusting mechanism. In this figure, 95 represents the main frame of the microscope which is pivotally mounted on the upright pillars of the base 96, and the main frame has an upright guide portion 97 secured thereto somewhat in the same manner as described in connection with Figs. 1 to 7, the main frame in the construction shown being partly hollow and bored to receive parts of the coarse and fine adjustment mechanism. The arm 98 of the microscope has a long sliding bearing on the upright guide portion 97 similar to that shown in Figs. 1 to 7 and also a guard 99 is provided which is secured to the main frame and extends about the arm. This microscope has a floating bearing block or element 100, which is interposed between the adjusting means and the arm of the microscope and which is slidably mounted on the arm 98, the arm in the construction shown being provided on the rear face thereof with a dove-tailed portion 101, with which the two parts of the floating bearing block or element 100 engage. The arm also has a rack 103 secured thereto with which a pinion 104 meshes, this pinion being journalled in the floating bearing block and arranged in a hollowed-out portion or recess in this block, the pinion meshing with a gear 105 similarly journalled and arranged in the floating bearing block. The floating bearing block may be readily drilled and reamed to form the bearings for the shafts of these two gears, and the two parts of the block then separated and the bearing holes counterbored or enlarged sufficiently to receive the gears.

The microscope has an inclination joint similar in construction to that shown in Figs. 1 to 10, the joint comprising a pair of trunnions 110 bearing in the columns of the base and having flanges secured to the main frame 95. Two hollow coarse adjustment shafts 111 and 112 are arranged within the trunnions 110 and are actuated by means of coarse adjustment actuating means, such as disks or buttons 114. The two coarse adjustment shafts are connected by means of a sleeve 115 similar to the sleeve 41 shown in Figs. 1 to 7 and a beveled pinion 117 is mounted on the coarse adjustment shaft 112 and also secured to the sleeve 115 so that this bevel gear may be turned by either of the coarse adjustment buttons. This bevel gear meshes with another bevel gear 118. The bevel gear 118 has a hollow shaft 119 which is preferably formed integral therewith and which is journalled to rotate in a cylindrical bore formed in the main frame 95.

In order to transmit motion of the coarse adjustment shafts to the gear 105 in the floating bearing block, a suitable floating drive connection is provided so that rotation of the coarse adjustment shaft will be transmitted to the floating bearing block in any position that the block may occupy while being adjusted by means of the fine adjustment mechanism. In the construction shown in Figs. 8 to 11, this floating drive comprises a drive member 120 which may be a part of or secured to the hollow shaft 119 of the bevel gear 118. In the construction shown, this drive member is provided with a slot 121 extending across the upper portion thereof, as shown in Figs. 8 and 11, and this member 120 is secured to the hollow shaft 119 by means of a pin 122. Any other means for providing a slot in the hollow shaft 119 may be provided.

A shaft 125 of a bevel gear 126 has the lower portion thereof flattened on opposite sides so that this portion of the shaft may enter into the slot 121 of the drive member 120. The shaft 125 and bevel gear 126 are arranged in the floating bearing member 100 and the bevel gear 126 meshes with another bevel gear 127, Fig. 9, which is on the same shaft as the gear 105. From the foregoing, it will be obvious that upon turning either of the coarse adjustment buttons 114, the bevel gear 117 will be turned, thus imparting rotary motion to the bevel gear 118, which in turn through the floating drive connection including the drive member 120 and the flattened sides of the shaft 125, impart motion through the bevel gears 126 and 127 to the gears 105 and 104, the latter gear meshing with the rack 103 secured to the arm 98 of the microscope. As the floating bearing block 100 is moved up and down by means of the fine adjustment mechanism to be described, the shaft 125 will move up and down in the slot 121 of the drive member 120.

The fine adjustment mechanism shown in Figs. 3 to 11 is similar in construction to the one described in connection with Figs. 1 to 7, and includes a pair of coarse adjustment buttons 130 or other actuating means, mounted on the opposite ends of a fine adjustment shaft 131 which extends through the hollow coarse adjustment shafts 111 and 112. This fine adjustment shaft 131, Fig. 8, has a screw-threaded portion which engages a fine adjustment nut 132 arranged within the sleeve 115 and connected through slots in this sleeve to a fine adjustment ring 133, one side of which engages the lower end of the long arm 135 of a fine adjustment lever, which is pivoted at 136 on the main frame of the microscope. This lever has a short arm 137 which engages a portion of the lower edge of the floating bearing block 100. Consequently, it will be obvious that upon turning either of the fine adjustment buttons 130, the fine adjustment lever 135 will be swung through the medium of the fine adjustment nut 132 and ring 133 to raise or lower the floating bearing block 100. During the raising and lowering of this block, the floating connection between the shaft 125 and the drive member 120 maintains a driving connection between those parts of the coarse adjustment mechanism which are mounted on the floating bearing block and those which are mounted on the main frame 95.

In order to make the operation of the fine adjustment mechanism more positive, a coil spring 140 is provided, the lower portion of which is secured to the main frame 95 and the upper portion of which is connected through a wire 141, which may be a part of the spring 140, to the floating bearing block 100, as shown in Fig. 10. This spring 140, consequently, operates in conjunction with the weight of the microscope arm 98 to hold the floating bearing block 100 in contact with the short arm 137 of the fine adjustment lever, and thus in turn holds the longer arm 135 in engagement with the fine adjustment ring 133.

In this construction, as in that described in connection with Figs. 1 to 7, the floating bearing block 100 is connected to the arm 98 with sufficient friction to enable the arm to be raised and lowered by raising and lowering the floating bearing block, and this friction may be introduced in any suitable or desired manner. The two parts of the block are secured together by means of screws 144 which may draw the two parts of the block into engagement with opposite sides of the guide track 101 of the arm 98, or into engagement with the ends of the gears 104 and 105, or into engagement with the shaft 125 of the gear 126. By adjusting the tension on the screws 144, the desired friction may be obtained, which friction can be overcome by the coarse adjustment mechanism, but not by the fine adjustment mechanism.

By means of the constructions shown, only a single bearing is necessary between the main frame and the arm, and both coarse and fine adjustments are made along this bearing. Consequently, this bearing can be made much longer than usual, thus increasing the strength of the instrument and adding materially to the accuracy and durability of the same.

I claim as my invention:

1. A microscope including a main frame, a stage mounted on said frame, a body tube, an arm carrying said body tube and movably mounted on said main frame to move said body tube toward and from said stage, a hollow coarse adjustment shaft rotatably mounted in said frame, a fine adjustment shaft rotatably mounted in said hollow coarse adjustment shaft and having a threaded portion, means for transmitting rotary motion of said coarse adjustment shaft to said arm for rapid adjustment thereof, a sleeve having a longitudinal slot and secured to said coarse adjustment shaft, a nut in said sleeve which is threaded to cooperate with the threaded portion of said fine adjustment shaft, a ring slidably mounted on the exterior of said sleeve and connected through the slot of said sleeve with said nut, and means cooperating with said ring for transmitting movement of said ring to said arm.

2. A microscope including a main frame, a stage mounted on said frame, a body tube, an arm carrying said body tube and movably mounted on said main frame to move said body tube toward and from said stage, a hollow coarse adjustment shaft rotatably mounted in said frame, a fine adjustment shaft rotatably mounted in said hollow coarse adjustment shaft and having a threaded portion, means for transmitting rotary motion of said coarse adjustment shaft to said arm for rapid adjustment thereof, a nut having a threaded portion cooperating with the threaded portion of said fine adjustment shaft and held against rotation relatively to said coarse adjustment shaft and free to move lengthwise with reference to said coarse adjustment shaft, and means for transmitting motion of said nut to said arm.

3. A microscope including a main frame, a stage mounted on said frame, a body tube, an arm carrying said body tube and movably mounted on said main frame to move said body tube toward and from said stage, a pair of hollow coarse adjustment shafts journalled in said main frame and extending toward opposite sides thereof, a sleeve connecting said hollow coarse adjustment shafts and having a longitudinal slot, means for converting rotary motion of said hollow coarse adjustment shafts into longitudinal movement of said arm, a fine adjustment shaft extending through said hollow coarse adjustment shafts and having a threaded part, a threaded nut cooperating with said threaded part and arranged within said slotted sleeve, a ring slidable on the exterior of said sleeve and connected with said nut through said slot, and means for transmitting motion of said ring to said arm independently of the adjustment of the same by said coarse adjustment.

4. A microscope including a main frame, a stage mounted on said frame, a body tube, an arm carrying said body tube and movably mounted on said main frame to move said body tube toward and from said stage, a hollow coarse adjustment shaft rotatably mounted in said frame, a fine adjustment shaft rotatably mounted in said hollow coarse adjustment shaft and having a threaded portion, a gear on said coarse adjustment shaft, means for converting rotary motion of said gear into longitudinal motion of said arm, a nut having threads cooperating with the threaded portion of said fine adjustment shaft and held against rotation relatively to said coarse adjustment shaft and movable lengthwise relatively to said coarse adjustment shaft, and means for transmitting lengthwise movement of said nut to said arm independently of the adjustment thereof by said coarse adjustment shaft.

5. A microscope including a base, a main frame having a pivotal connection with said base, a stage on said frame, a body tube carrying arm movably mounted on said main frame to move said body tube toward and from said stage, a hollow coarse adjustment shaft mounted on said main frame concentric with said pivotal connection, a fine adjustment shaft rotatably mounted in said hollow coarse adjustment shaft, means for converting rotary motion of said coarse adjustment shaft into longitudinal movement of said arm, a nut held against rotation relatively to said coarse adjustment shaft and movable lengthwise thereof and having a threaded portion cooperating with the threaded portion of said fine adjustment shaft, and means for transmitting movement of said nut to said arm to move the same independently of said coarse adjustment shaft.

6. A microscope including a frame, a body tube supporting arm, bearing means on said frame and arm forming a slidable connection between said frame and arm, a bearing block slidably mounted on said arm, a coarse adjustment mechanism having a part journalled in said bearing block and reacting against said arm for adjusting said arm on said bearing means relatively to said block and frame while said block remains in fixed relation to said frame, and a fine adjustment mechanism having a movable part for supporting said block and for moving said block and arm relatively to said frame on said bearing means, said coarse and fine adjustment mechanisms including adjustment shafts journalled on said frame to rotate about a common axis.

7. A microscope including a frame, a body tube supporting arm, bearing means on said frame and arm forming a slidable connection between said frame and arm, a bearing block slidably mounted and frictionally held on said arm, coarse adjustment means including a part journalled on said block and reacting against said arm for moving said arm in said bearing means relatively to said bearing block against the friction while said block remains in fixed relation to said frame, and fine adjustment means for moving said bearing block and arm on said bearing means, said arm being held on said bearing block by friction during the fine adjustments, said coarse and fine adjustment means including adjustment shafts mounted to rotate on bearings which are fixed relatively to said frame.

8. A microscope including a frame, a body tube supporting arm, bearing means on said frame and arm forming a slidable connection between said frame and arm, a bearing block slidably mounted on said arm, a coarse adjustment mechanism having a part journalled in said bearing block and another part journalled in said frame, a floating connection between said parts of said coarse adjustment mechanism, and a fine adjustment mechanism having a movable part for supporting said block and for moving said block, said arm and said part of said coarse adjustment mechanism journalled in said block, on said bearing means, said arm being held against movement relatively to said block by friction during fine adjustments and being moved against friction by said coarse adjustment mechanism.

9. A microscope including a frame, a body tube supporting arm, bearing means on said frame and arm forming a slidable connection between said frame and arm, a bearing block slidably mounted on said arm, a rack secured to said arm, a coarse adjustment mechanism including a pinion pivoted on said block and meshing with said rack, and another part pivoted on said frame, a universal joint connection between said parts, and a fine adjustment mechanism for moving said block and arm relatively to said frame.

10. A microscope including a frame, a body tube supporting arm, bearing means on said frame and arm forming a slidable connection between said frame and arm, a bearing block slidably mounted on said arm, a rack secured to said arm, a coarse adjustment mechanism including a pinion pivoted on said block and meshing with said rack and another part pivoted on said frame, and a floating connection between said parts, including a shaft connected to rotate with and slide lengthwise of said other part, and a fine adjustment mechanism for moving said block and arm relatively to said frame.

11. A microscope including a frame, a body tube supporting arm, bearing means on said frame and arm forming a slidable connection between said frame and arm, a bearing block slidably mounted on said arm, a rack secured to said arm, a coarse adjustment mechanism including a pinion, and an actuating shaft therefor pivoted on said bearing block and movable therewith, and a shaft on the frame connected to actuate said first mentioned shaft, and a fine adjustment mechanism supporting said block and constructed to move the same and said arm.

12. A microscope including a main frame, a stage mounted on said frame, a body tube, an arm carrying said body tube and movably mounted on said main frame to move said body tube toward and from said stage, a pair of hollow coarse adjustment shafts journalled in said main frame and extending toward opposite sides thereof, a sleeve connecting said hollow coarse adjustment shafts and having a longitudinal slot, means for converting rotary motion of said hollow coarse adjustment shafts into longitudinal movement of said arm, a fine adjustment shaft extending through said hollow coarse adjustment shafts and having a threaded part, a threaded nut cooperating with said threaded part and arranged within said slotted sleeve and between the inner ends of said coarse adjustment shafts, the ends of said coarse adjustment shafts serving to limit the movement of said nut in said sleeve, a ring slidable on the exterior of said sleeve and connected with said nut through said slot, and means for transmitting motion of said ring to said arm independently of the adjustment of the same by said coarse adjustment.

13. A microscope having a body tube supporting arm adjustably mounted on the frame of the microscope for moving the body tube toward and from the specimen, a rotatable slotted hollow sleeve having a gear mounted thereon to rotate therewith, means driven by said gear for effecting coarse adjustment of said arm when said sleeve is turned, a fine adjustment nut within said sleeve, a threaded fine adjustment shaft having a threaded part engaging said nut, and means extending through the slot of said sleeve for holding said nut against turning relatively to said sleeve and for transmitting movement of said nut lengthwise of said sleeve to said arm for effecting fine adjustment thereof.

14. A microscope including a main frame, a body tube carrying arm slidable in a substantially vertical direction on said main frame for adjusting the body tube relatively to a specimen, a hollow coarse adjustment shaft rotatably mounted in said frame, a fine adjustment shaft rotatably mounted in said hollow coarse adjustment shaft, means for transmitting rotary motion of said coarse adjustment shaft to said arm for rapid adjustment thereof relatively to said frame, a sleeve secured to said coarse adjustment shaft, a ring slidably mounted on the exterior of said sleeve, means actuated by said fine adjustment shaft for moving said ring lengthwise of said sleeve, and means cooperating with said ring for transmitting movement of said ring lengthwise of said sleeve to said arm for effecting fine adjustment thereof.

15. A microscope including a main frame, a body tube carrying arm slidable in a substantially vertical direction on said main frame for adjusting the body tube relatively to a specimen, a hollow coarse adjustment shaft rotatably mounted in said frame, a fine adjustment shaft rotatably mounted in said hollow coarse adjustment shaft, means for transmitting rotary motion of said course adjustment shaft to said arm for rapid adjustment thereof relatively to said frame, a ring arranged concentrically with said shafts, means connecting said fine adjustment shaft and said ring for moving said ring axially relatively to said shafts, and means cooperating with said ring for transmitting axial movement of said ring to said arm for effecting fine adjustment thereof.

16. A microscope including a main frame, a body tube carrying arm slidable in a substantially vertical direction on said main frame, for adjusting the body tube relatively to a specimen, a hollow coarse adjustment shaft rotatably mounted in said frame, a fine adjustment shaft rotatably mounted in said hollow coarse adjustment shaft and having a threaded portion, means for transmitting rotary motion of said coarse adjustment shaft to said arm for rapid adjustment thereof relatively to said frame, a ring mounted to rotate with said coarse adjustment shaft and to move axially thereof, means connected with the threaded portion of said fine adjustment shaft for moving said ring axially of said coarse adjustment shaft, and means cooperating with said ring for transmitting axial movement of said ring to said arm.

HARVEY N. OTT.